(12) United States Patent
Xue et al.

(10) Patent No.: US 11,483,042 B2
(45) Date of Patent: Oct. 25, 2022

(54) QUALIFYING MACHINE LEARNING-BASED CSI PREDICTION

(71) Applicant: QUALCOMM Incorporated, San Diego, CA (US)

(72) Inventors: Yisheng Xue, San Diego, CA (US); Weiliang Zeng, San Diego, CA (US); Xiaoxia Zhang, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 16/888,593

(22) Filed: May 29, 2020

(65) Prior Publication Data

US 2021/0376895 A1    Dec. 2, 2021

(51) Int. Cl.
| | |
|---|---|
| *H04B 7/06* | (2006.01) |
| *G06N 20/00* | (2019.01) |
| *H04L 1/18* | (2006.01) |
| *H04L 41/16* | (2022.01) |

(52) U.S. Cl.
CPC ........... *H04B 7/0626* (2013.01); *G06N 20/00* (2019.01); *H04L 1/1812* (2013.01); *H04L 1/1861* (2013.01); *H04L 41/16* (2013.01)

(58) Field of Classification Search
CPC ..... H04L 1/1812; H04L 1/1861; H04L 41/16; H04L 1/0029; H04L 1/1671; H04L 1/1854; H04L 25/0254; H04L 1/0026; H04B 7/0626; G06N 20/00; G06F 30/27
See application file for complete search history.

(56) References Cited

U.S. PATENT DOCUMENTS

| | | | | |
|---|---|---|---|---|
| 2008/0137635 A1* | 6/2008 | Pan | ........................ | H04L 1/0625 370/345 |
| 2011/0280287 A1* | 11/2011 | Cheng | ................... | H04L 1/0019 375/219 |
| 2012/0250557 A1* | 10/2012 | Zirwas | .............. | H04W 72/1231 370/252 |

(Continued)

FOREIGN PATENT DOCUMENTS

| | | |
|---|---|---|
| WO | 2020025109 A1 | 2/2020 |
| WO | WO-2020036521 A1 * | 2/2020 ........... H04B 7/0695 |

OTHER PUBLICATIONS

"A Machine Learning Approach for SNR Prediction in 5G Systems"; Saija et al.; 2019 IEEE International Conference on Advanced Networks and Telecommunications Systems (ANTS); Dec. 16-19, 2019 (Year: 2019).*

(Continued)

*Primary Examiner* — Benjamin H Elliott, IV
(74) *Attorney, Agent, or Firm* — Yanling Yang

(57) ABSTRACT

Certain aspects of the present disclosure provide techniques for qualifying machine learning model-based channel state information (CSI) predictions. An example method generally includes receiving, from a network entity, a channel state information (CSI) prediction model for quantized CSI, calculating CSI based on downlink reference signal measurements, generating a quantized CSI difference value based a quantization of a difference between the calculated CSI and CSI predicted based on a CSI prediction model, and reporting, to the network entity, the calculated CSI and the quantized CSI difference value.

27 Claims, 11 Drawing Sheets

(56) References Cited

U.S. PATENT DOCUMENTS

| | | | | |
|---|---|---|---|---|
| 2018/0367192 | A1* | 12/2018 | O'Shea | G06N 3/08 |
| 2020/0052757 | A1* | 2/2020 | Wang | H04W 24/02 |
| 2020/0228179 | A1* | 7/2020 | Wang | G06N 20/00 |
| 2021/0211164 | A1* | 7/2021 | O'Shea | G06N 3/0445 |
| 2021/0258063 | A1* | 8/2021 | Ottersten | H04W 24/04 |
| 2021/0258991 | A1* | 8/2021 | Bao | H04L 5/0057 |
| 2021/0273707 | A1* | 9/2021 | Yoo | G06N 20/00 |
| 2021/0345134 | A1* | 11/2021 | Ottersten | H04W 40/18 |
| 2021/0351885 | A1* | 11/2021 | Chavva | G06N 3/0454 |
| 2021/0376895 | A1* | 12/2021 | Xue | H04L 1/0026 |

OTHER PUBLICATIONS

"Channel State Information Prediction for 5G Wireless Communications: A Deep Learning Approach"; Luo et al.; IEEE Transactions on Network Science and Engineering, vol. 7, No. 1, Jan.-Mar. 2020 (Year: 2020).*

"Client Side Channel State Information Estimation for MIMO Communication"; Tiwari et al.; Proc. EECSI 2019—Bandung, Indonesia, Sep. 18-20, 2019 (Year: 2019).*

"Human Activity Recognition and Prediction Based on Wi-Fi Channel State Information and Machine Learning"; Kim et al.; 2019 International Conference on Artificial Intelligence in Information and Communication (ICAIIC); Feb. 11-13, 2019 (Year: 2019).*

"Machine Learning for RF Slicing Using CSI Prediction in Software Defined Large-Scale MIMO Wireless Networks"; Sapavath et al.; IEEE Transactions on Network Science and Engineering, vol. 7, No. 4, Oct.-Dec. 2020 (Year: 2020).*

"Machine Learning Prediction based CSI Acquisition for FDD Massive MIMO Downlink"; Dong et al.; 2018 IEEE Global Communications Conference (GLOBECOM); (Year: 2018).*

International Search Report and Written Opinion—PCT/US2021/024723—ISA/EPO—dated Jul. 1, 2021.

* cited by examiner

QUALIFYING MACHINE LEARNING-BASED CSI PREDICTION

FIELD OF THE DISCLOSURE

Aspects of the present disclosure relate to wireless communications, and more particularly, to techniques for predicting channel state information (CSI) using machine learning models and qualifying CSI predictions made using machine learning models.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include efficient modification of synchronization signal block (SSB) patterns, for example, to select a reduced number of optimal beams that may allow for reduced monitoring time by a UE and/or free up resources for data transmissions.

Certain aspects of the subject matter described in this disclosure can be implemented in a method for wireless communication by a user equipment. The method generally includes receiving, from a network entity, a channel state information (CSI) prediction model for quantized CSI, calculating CSI based on downlink reference signal measurements, generating a quantized CSI difference value based a quantization of a difference between the calculated CSI and CSI predicted based on a CSI prediction model, and reporting, to the network entity, the calculated CSI and the quantized CSI difference value.

Certain aspects of the subject matter described in this disclosure can be implemented in a method for wireless communication by a network entity. The method generally includes transmitting, to a user equipment (UE), a channel state information (CSI) prediction model for predicting CSI and one or more reference signals for the UE to use in calculating CSI and generating one or more CSI difference values based on a calculated CSI and a CSI predicted based on the CSI prediction model, receiving, from the UE, a calculated CSI and a quantized CSI difference value, and communicating with the UE based on the calculated CSI and the quantized CSI difference value.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

and qualify CSI predictions, in accordance with certain aspects of the present disclosure.

Figure 7:
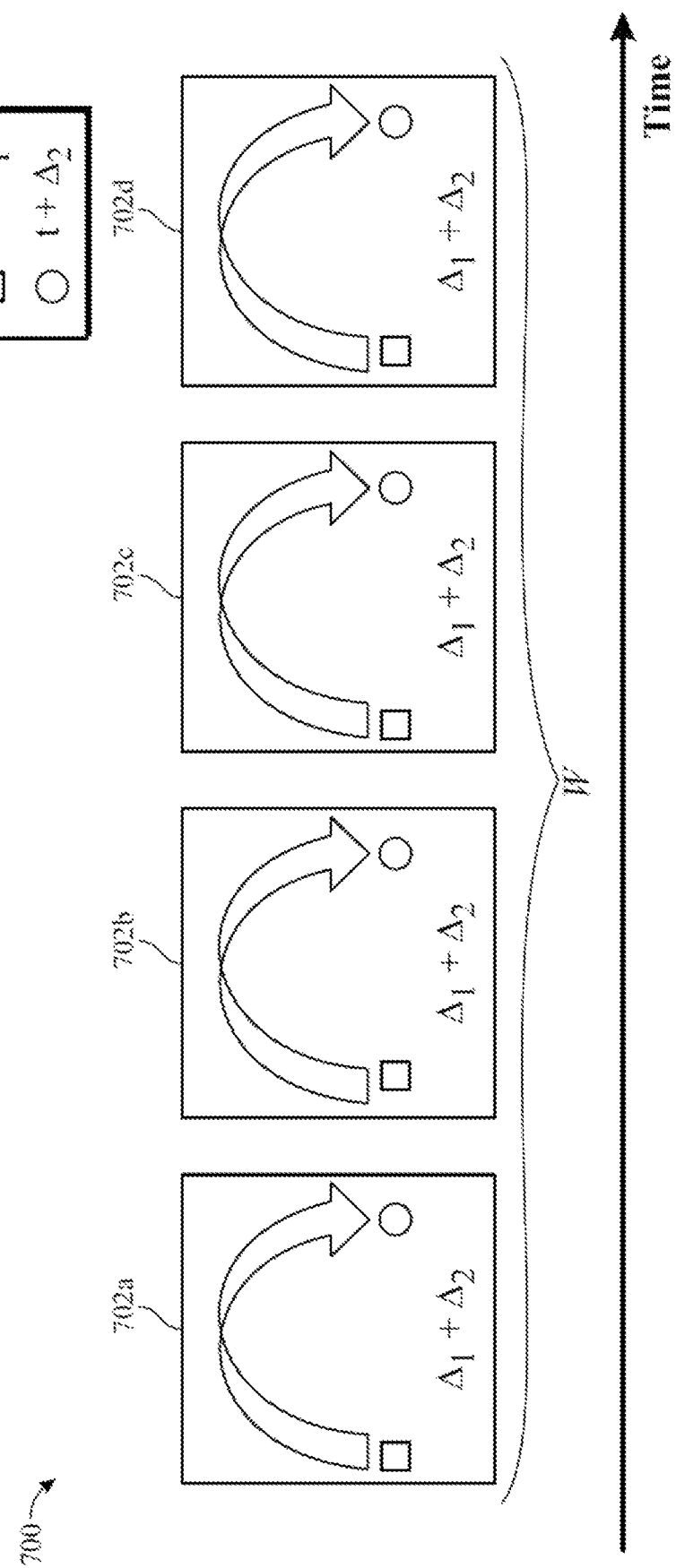

FIG. 7 illustrates an example timeline over which channel state information (CSI) may be predicted using a machine learning model and qualified based on a qualifying scheme and measured CSI, in accordance with certain aspects of the present disclosure.

Figure 8:
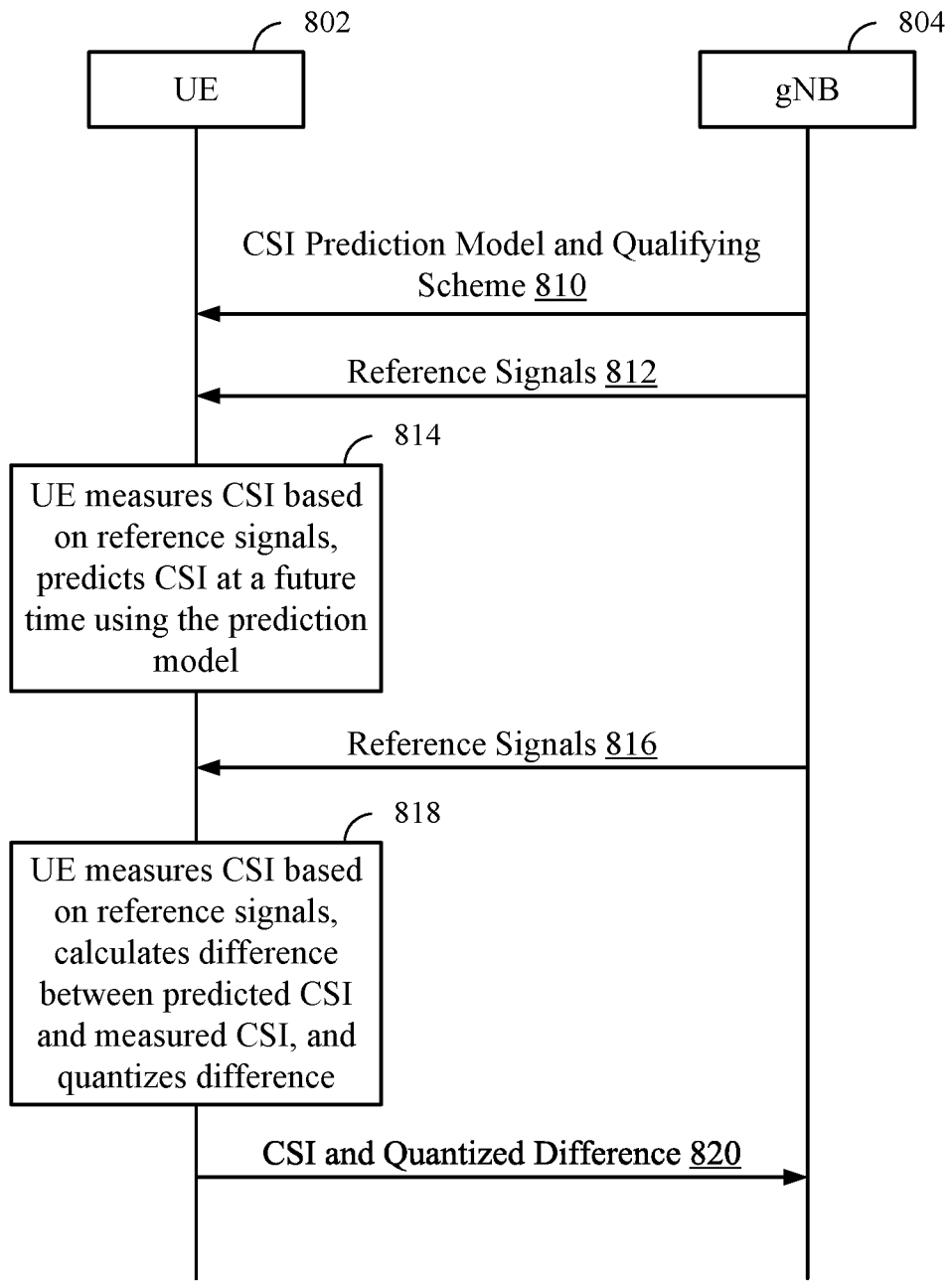

FIG. 8 is a call flow diagram illustrating configuration of a user equipment (UE) to predict channel state information (CSI) based on a machine learning model and qualify the predicted CSI, in accordance with certain aspects of the present disclosure.

Figure 9:
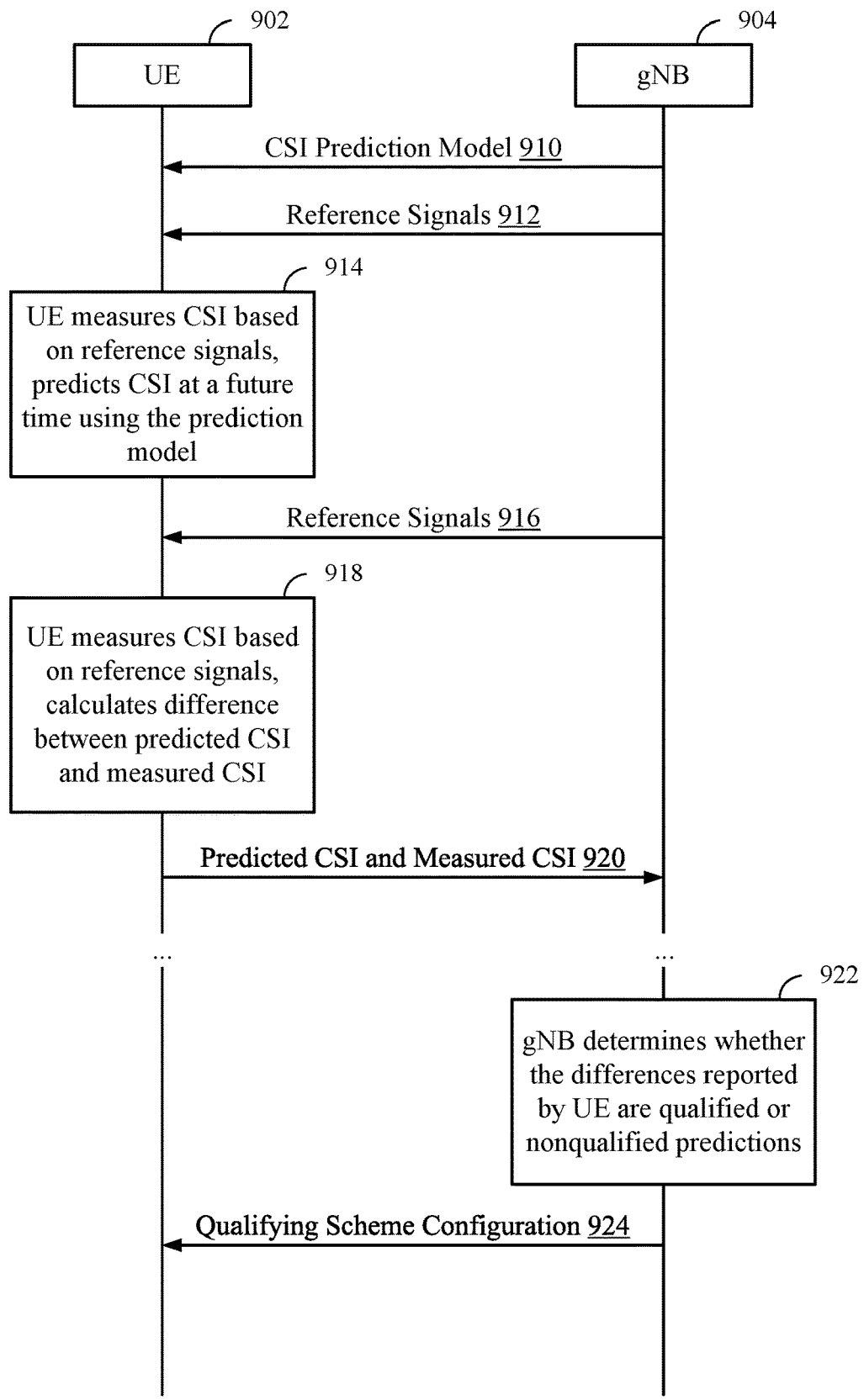

FIG. 9 is a call flow diagram illustrating an example of configuring a user equipment to qualify CSI predicted based on a machine learning model, in accordance with certain aspects of the present disclosure.

Figure 10:
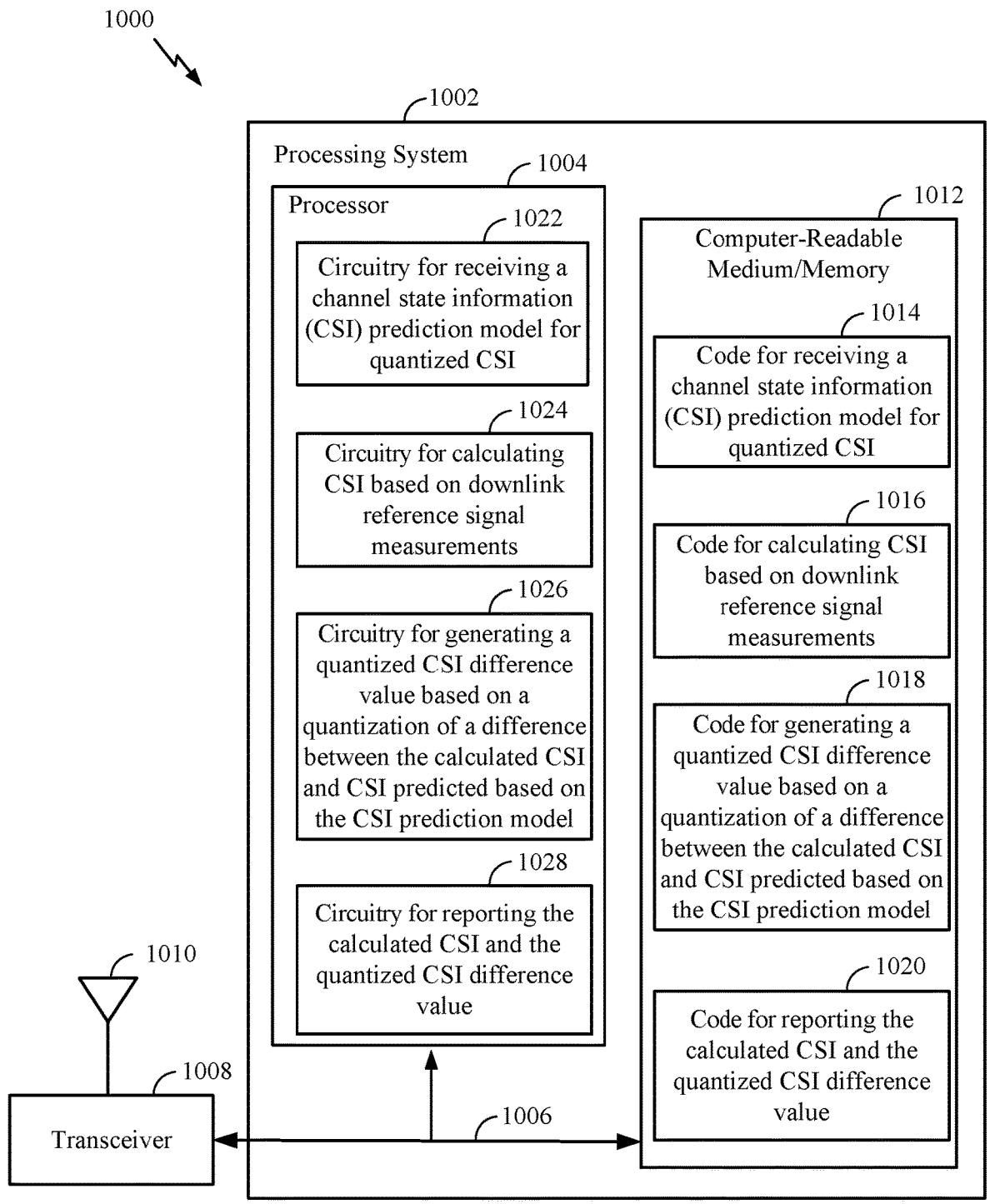

FIG. 10 illustrates a communications device that may include various components configured to perform operations for the techniques disclosed herein, in accordance with aspects of the present disclosure.

Figure 11:
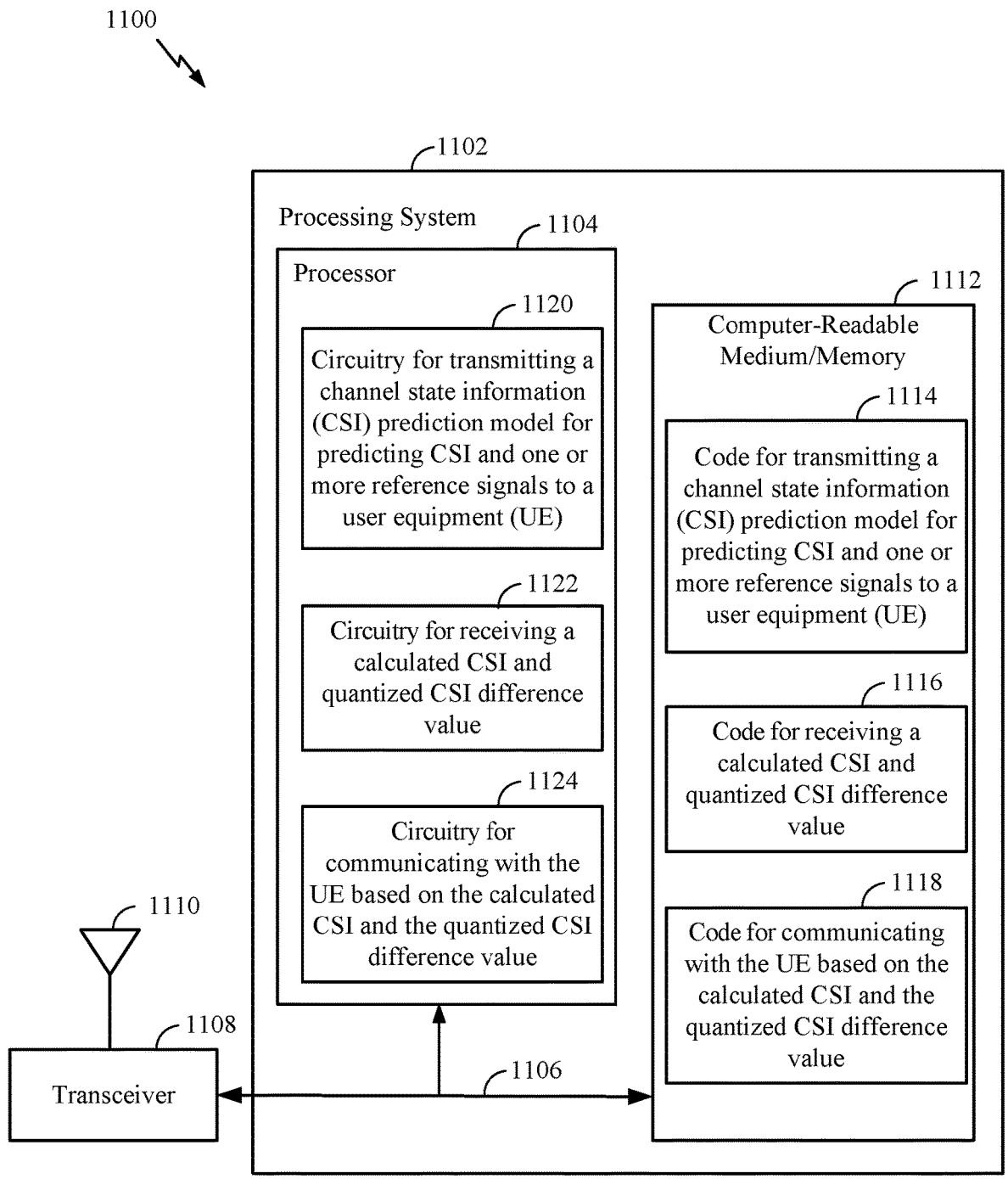

FIG. 11 illustrates a communications device that may include various components configured to perform operations for the techniques disclosed herein, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for predicting channel state information (CSI) using machine learning models and qualifying predicted CSI based on a difference between the predicted CSI and measured CSI. In some cases, predicting CSI based on a machine learning model and reporting whether a CSI prediction is qualified or not qualified may reduce overhead for the reporting of CSI and improve the accuracy of CSI reporting (e.g., in conditions where channel conditions or interference are rapidly changing). Further, predicting CSI based on a machine learning model and reporting whether a CSI prediction is qualified or not qualified may provide for improved reliability of connections between a network entity and a user equipment (UE) and reduce latency (e.g., in adjusting parameters of a network connection between a UE and a network entity using predicted CSI instead of waiting for the UE to report a CSI measurement).

The following description provides examples of predicting channel state information (CSI) using machine learning models and qualifying predicted CSI based on a difference between the predicted CSI and the measured CSI and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 µSec, while in FR4 with 960 kHz, the slot length is 15.6 µSec.

Figure 1:
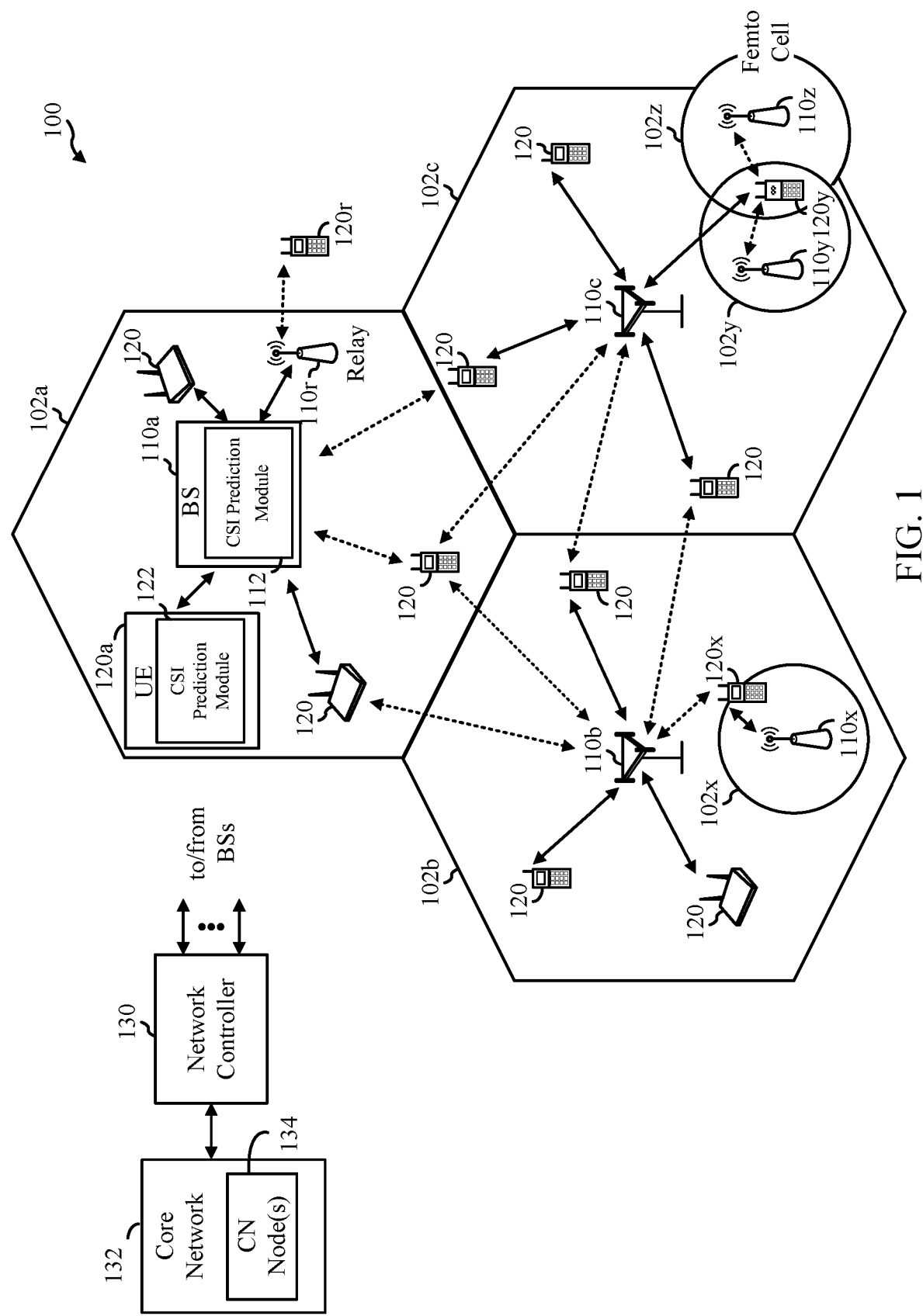
FIG. 1 is a block diagram conceptually illustrating an example wireless communication network, in accordance with certain aspects of the present disclosure.

FIG. 1 illustrates an example wireless communication network 100 in which aspects of the present disclosure may be performed. For example, a base station (BS) 110a of the wireless communication network 100 may be configured with a CSI Prediction Module 112 configured to perform (or assist BS 110 in performing) operations 600 of FIG. 6 to configure the UE 120 to predict channel state information (CSI) and qualify the predicted CSI, in accordance with aspects of the present disclosure. Similarly, a UE 120a of the wireless communication network 100 may be configured with a CSI Prediction Module 122 configured to perform (or assist UE 120 in performing) operations 500 of FIG. 5 to predict channel state information (CSI) and qualify the predicted CSI, in accordance with aspects of the present disclosure.

The wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Figure 2:
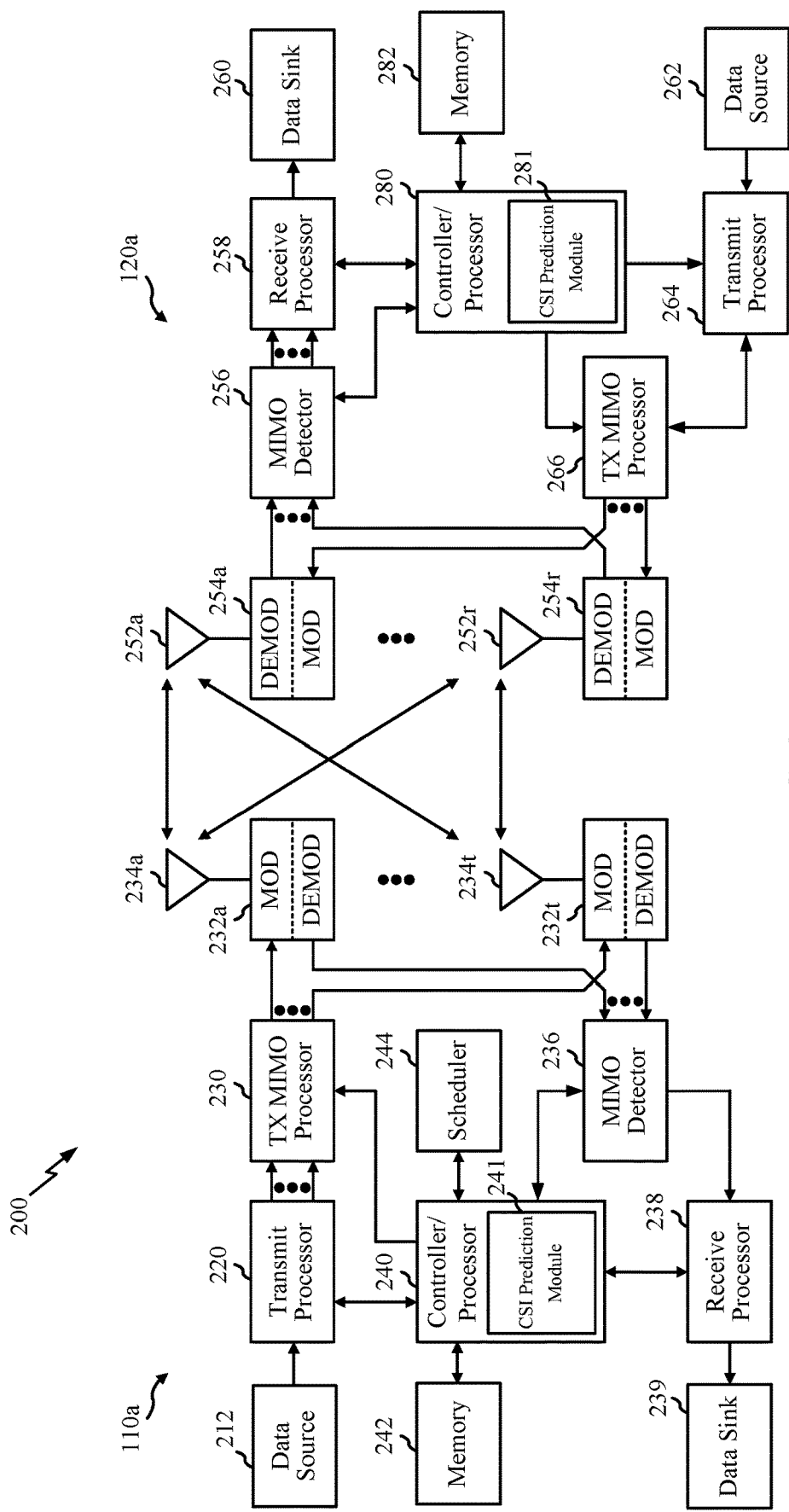
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a CSI Prediction Module 241 and the controller/processor 280 of the UE 120a has a CSI Prediction Module 281. The CSI Prediction Module 241 may be configured to perform operations 600 of FIG. 6 and/or the CSI Prediction Module 281 may be configured to perform operations 500 of FIG. 5. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.). The symbol and slot lengths scale with the subcarrier spacing. The CP length also depends on the subcarrier spacing.

Figure 3:
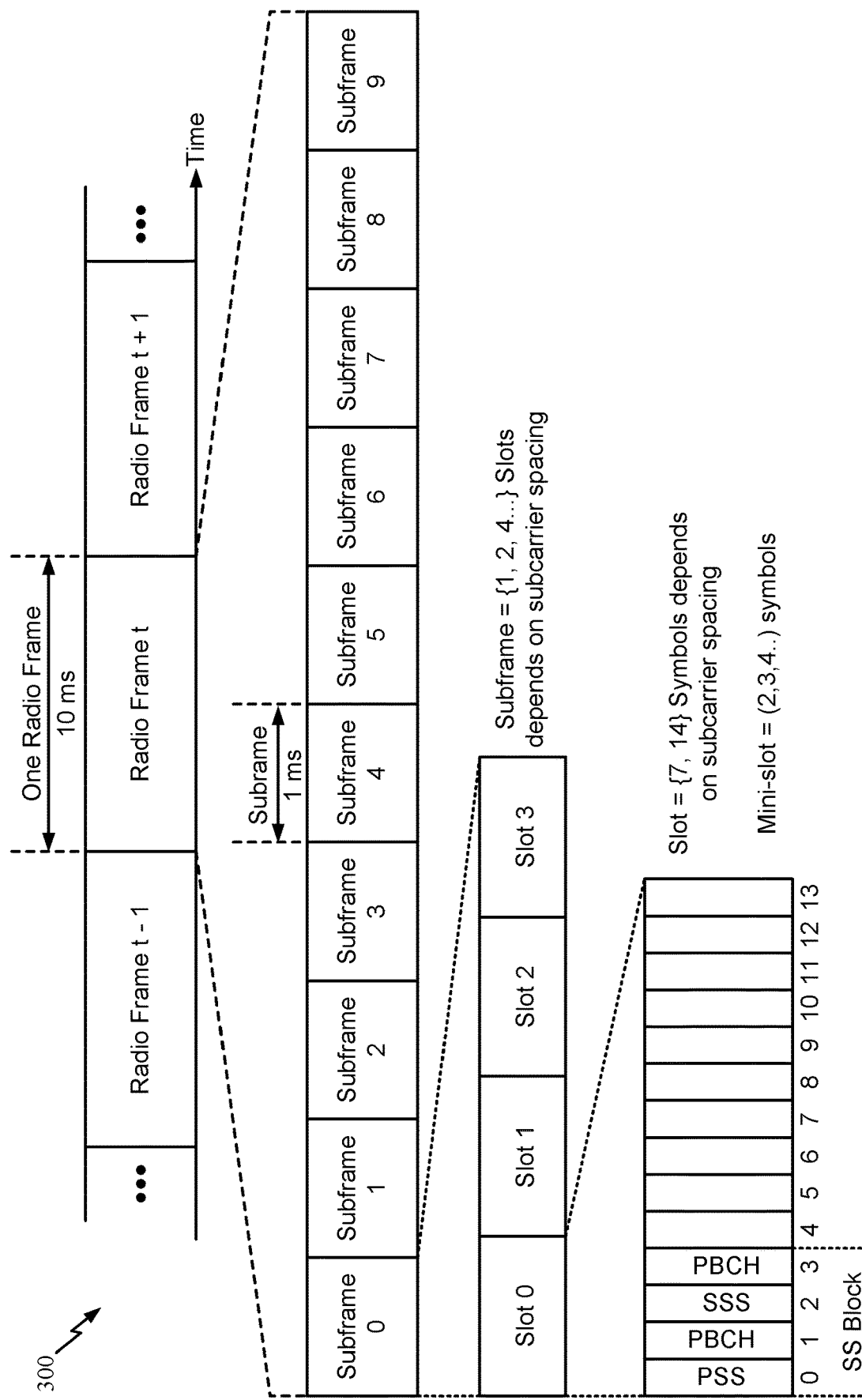
FIG. 3 is an example frame format for communication in a wireless communication network, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Example ML-Based Channel State Information (CSI) Prediction

Channel state information (CSI) may be used for various purposes, such as link adaptation through adaptive modulation and coding (AMC), multi-user diversity (MUD) through proporational fair (PF) scheduling, for multi-user (MU) multiple-in, multiple-out (MIMO) (MU-MIMO) communications, and so on. To facilitate CSI feedback over a wireless network link, a transmitter generally arranges a series of pilot occasions for the receiver(s) that are to measure CSI, and the transmitter and receiver arrange a series of feedback occasions to collect CSI feedback (i.e., for the receiver to transmit CSI feedback, and for the transmitter to receive the CSI feedback from the receiver). The transmitter may use the CSI feedback received at a time t to transmit to the receiver at a time $t+\Delta_2$.

Generally, to minimize overhead, the periodicity of the feedback occasions may be the same or greater than the periodicity of the pilot occasions. Further, during a feedback occasion, a UE may report compressed or quantized CSI. Generally, to report quantized CSI, the receiver may report, at time t, the CSI measured before $t-\Delta_1$.

Because channel conditions may change between receiving a reference signal or pilot signal (e.g., during a pilot occasion) and transmitting a CSI report at time t, the time gap between CSI measurement and transmission of a subsequent signal based on the CSI measurement may result in inaccurate CSI being used to perform transmissions between the transmitter and the receiver. That is, the CSI measured at time $t-\Delta_1$ and the transmission at time $t+\Delta_2$ may result in a time delay between measurement and transmission of $\Delta_1+\Delta_2$, and thus, the transmitter can potentially use outdated or inaccurate CSI to perform a transmission at time $t+\Delta_2$ due to CSI aging (e.g., changing channel conditions during the time delay of $\Delta_1+\Delta_2$). To account for CSI aging during the time delay of $\Delta_1+\Delta_2$ between CSI measurement and transmissions based on the measured CSI, a transmitter can use a back-off procedure for performing transmissions to the receiver. The back-off procedure generally allows the transmitter to use a more conservative transmission mode than the transmission mode that may be indicated by the CSI feedback (e.g., based on the CSI measurement at time $t-\Delta_1$). For example, the transmitter can use a lower modulation and coding scheme (MCS), reduced rank, or the like for the transmission at time $t+\Delta_2$ than the CSI feedback generated based on the CSI measurement at time $t-\Delta_1$ and reported at time t may indicate.

In some cases, CSI feedback may account for CSI aging and differences in a channel state that may arise between measurement at time $t-\Delta_1$ and transmission based on the CSI feedback at time $t+\Delta_2$. Various techniques may be used to account for CSI aging, and these techniques may assume, for example, varying amounts of changes in CSI between measurement at time $t-\Delta_1$ and transmission based on the CSI feedback at time $t+\Delta_2$. In some embodiments, machine learning models may be used to predict CSI at time $t+\Delta_2$ and account for CSI aging. These machine learning models may be, for example, a long-short term memory (LSTM) model, a gated recurrent unit (GRU), a neural network, or other machine learning models that may allow for predictions of CSI at a future point in time.

Figure 4:
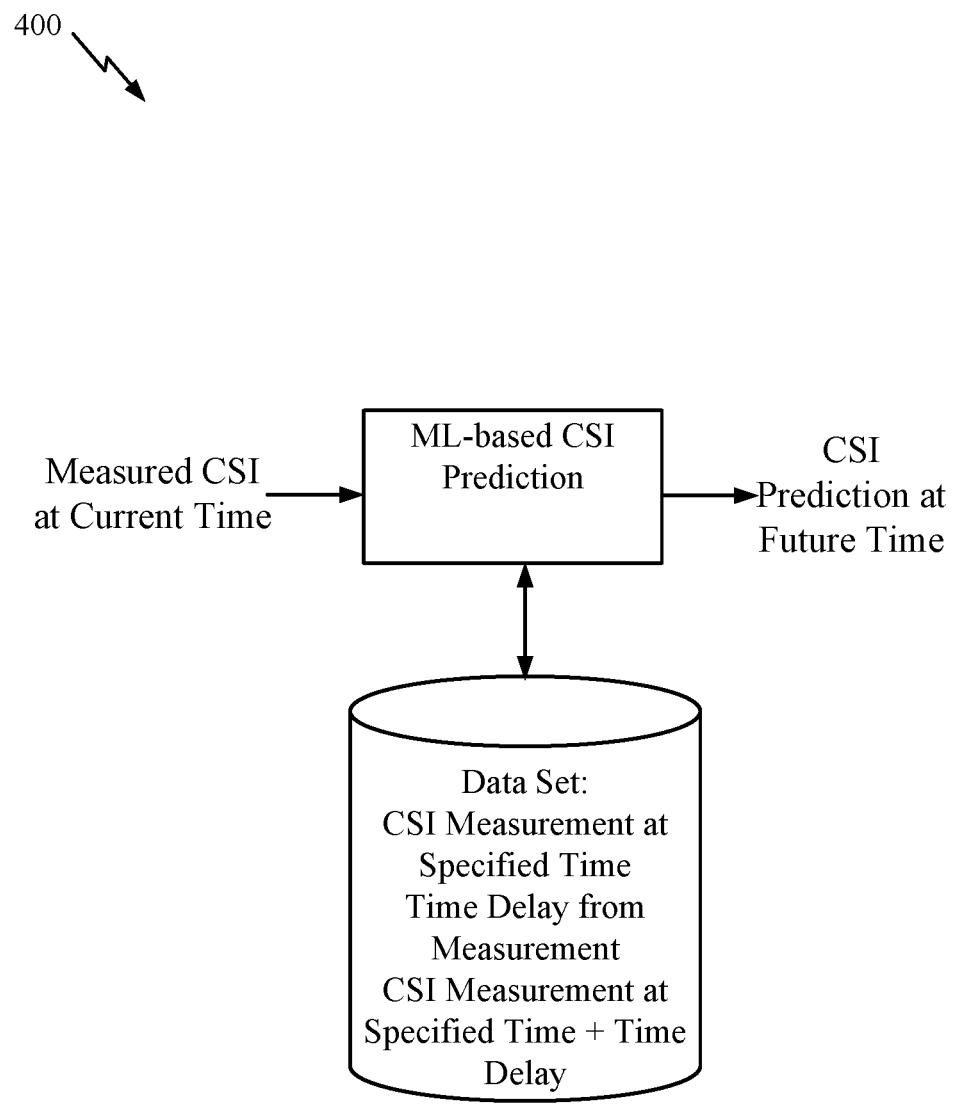
FIG. 4 illustrates an example machine learning (ML) based channel state information (CSI) prediction module, in accordance with certain aspects of the present disclosure.

As illustrated in FIG. 4, a machine learning (ML) based (CSI prediction) model may be trained to learn relationships between measured CSI at a first time, measured CSI at a second time, and the time delay between the first time and the second time. CSI measurements may be performed at the UE and reported to the gNB. These measurements may be added to a training data set that may be used to train (or re-train) the ML-based CSI prediction model. As the size of the dataset (associating measured CSI at a first time and measured CSI at a second time with a time delay between the first time and the second time) may be very large, it is not feasible to share the entire dataset with the UE. In some cases, rather than share the data set, a more practical approach may be to train the model, such as a neural network (NN), using the dataset, and then share the neural network model and the parameters (e.g., weights and the like) for the trained model with the UE. The UE can then use the trained NN to predict CSI based on a time delay between measurement of CSI and transmission based on CSI feedback reported to the gNB.

Such a machine learning model may be trained using various techniques to learn how to predict CSI based on a time delay between measurement of CSI and transmission based on CSI feedback reported to the gNB. Given an input of a CSI measurement and a time delay between measurement and transmission based on CSI feedback reported to the gNB, the trained machine learning model can predict CSI at the time at which a transmission is expected to be performed by the gNB.

In some embodiments, the machine learning model may be trained using supervised learning techniques in which an input data set of a plurality of {CSI measurement at time $t-\Delta_1$, CSI measurement at time $t+\Delta_2$, and the time delay $\Delta_1+\Delta_2$} n-tuples is used to train the machine learning model to recognize relationships between the time delay and the predicted CSI at time $t+\Delta_2$. The input data set may be, for example, a CSI measurement performed at time $t-\Delta_1$ and the time delay $\Delta_1+\Delta_2$, and the machine learning model may be trained to output a prediction of channel conditions at time $t+\Delta_2$ (i.e., the time at which the gNB is expected to perform a transmission to the UE based on the CSI feedback provided by the UE and generated based on the CSI measurement at time $t-\Delta_1$). In some embodiments, the machine learning model may include a softmax layer that generates a probability score for each of a plurality of CSI values. The value(s) that may be identified as the predicted CSI at time $t+\Delta_2$ may, thus, be the n values with the highest probability scores generated by the machine learning model.

The machine learning model may be trained offline and deployed to a user equipment (UE) for use in predicting CSI and reporting CSI feedback based on the predicted CSI, which the gNB may use for determining parameters for transmitting data to the UE. During deployment, the UE may independently measure CSI at times $t-\Delta_1$ and $t+\Delta_2$ and determine the accuracy of predictions of CSI at time $t+\Delta_2$. If the predictions are consistently inaccurate by more than a threshold amount, the UE can determine that the model is inaccurate and can update the training data set using recorded CSI and instruct the gNB to reconfigure the UE with an updated, retrained machine learning model.

The machine learning described herein may use any appropriate machine learning algorithm. In some non-limiting examples, the machine learning algorithm is a supervised learning algorithm, unsupervised learning algorithm, reinforcement learning algorithm, a deep learning algorithm, an artificial neural network algorithm, or other type of machine learning algorithm.

In some examples, the machine learning is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some examples, the machine learning is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement machine learning, such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

Example Qualifying Machine Learning-Based Channel State Information Prediction

Aspects of the present disclosure provide techniques for predicting channel state information (CSI) using machine learning models and qualifying CSI predictions made using machine learning models. The techniques may be used, for example, to allow for the use of CSI predictions for transmissions between a network entity (e.g., a gNodeB) and a UE and may result in more efficient use of wireless communications resources, improved reliability for communications between the network entity and the UE, and the like.

As discussed, using machine learning models to predict CSI at a time at which a network entity is to transmit to a UE may result in improved accuracy of the CSI used to determine transmission parameters and may thus result in, for example, increased throughput, improved reliability, and other improvements to wireless communications relative to transmission performed using transmission parameters identified based on an a priori defined CSI backoff scheme. Further, a network entity can improve network efficiency by learning the accuracy of CSI reports generated by a UE and may do so more quickly based on predicted CSI versus learning a posteriori whether the CSI reported by the UE is accurate (e.g., based on acknowledgment (ACK)/negative acknowledgment (NACK) statistics, which may result in a number of failed transmissions and retransmissions that effectively reduces network throughput).

However, because generating predictions based on a machine learning model may be a more resource-intensive process than using an a priori defined backoff scheme, reporting inaccurate predictions may result in the use of computing resources and power for limited or no improvement in communications between the network entity and the UE (or even degradation in network performance). For example, reporting inaccurate CSI, which may include inaccurate early hybrid automatic repeat request (HARQ) feedback, may negatively impact network performance. For example, a correct early NACK may trigger an early retransmission of the NACKed transmission which may help to meet a delay budget; however, an incorrect early NACK (e.g., a false alarm) may result in a wasted retransmission. In another example, a correct early ACK may trigger an earlier release of redundant resources (and correspondingly increase available resources, which may be beneficial in loaded networks); however, an incorrect early NACK may generate a packet loss to the media access control (MAC) or other higher layers.

Aspects of the present disclosure may thus allow for the prediction of CSI and qualifying CSI predictions to minimize, for example, false alarms, misdetection, and other conditions that may degrade network performance (e.g., in highly loaded networks, where inaccurate predictions may have a significant negative effect on network performance). By predicting CSI and identifying whether the prediction is qualified or not qualified (e.g., whether the predicted CSI is within an accuracy threshold, or whether the predicted CSI falls within one or more categories that are considered to be sufficiently accurate), network performance may be increased through increases in throughput, decreases in negative effects caused from inaccurate reporting, and the like.

Figure 5:
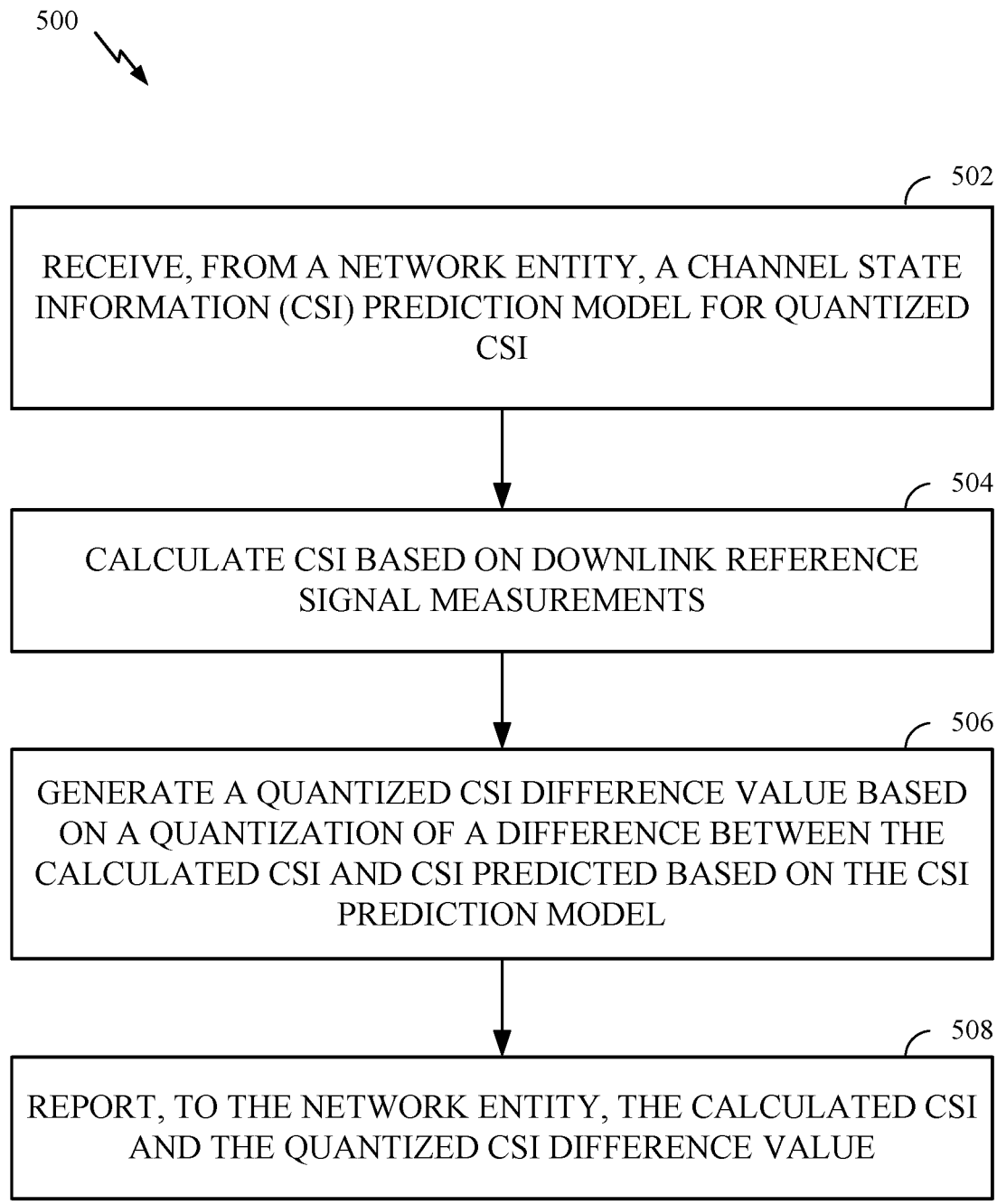
FIG. 5 illustrates example operations for wireless communication by a user equipment for predicting channel state information (CSI) and qualifying CSI predictions, in accordance with certain aspects of the present disclosure.

FIG. 5 illustrates example operations 500 for wireless communications by a user equipment (UE). For example, operations 500 may be performed by a UE 120 of FIG. 1 or FIG. 2 to predict CSI and quantize the accuracy of the predicted CSI, in accordance with certain aspects of the present disclosure.

As illustrated, operations 500 begin at block 502, where the UE receives, from a network entity, a channel state information (CSI) prediction model for quantized CSI. The CSI prediction model may be a machine learning model that the UE may execute to predict CSI based on a current CSI measurement and a time delay between when the current CSI measurement was generated and when a network entity is to perform a transmission based on CSI feedback reported to the network entity.

At block 504, the UE calculates CSI based on downlink reference signal measurements.

At block 506, the UE generates a quantized CSI difference value based on a quantization of a difference between the calculated CSI and the CSI predicted based on the CSI prediction model. Generally, the quantized CSI difference value may be a value that indicates a relative level of accuracy for the CSI predicted based on the CSI prediction model. For example, rules for quantizing the CSI difference value may quantize the difference value into one of two values representing a coarse classification of the difference value (e.g., within a threshold amount or not within the threshold amount). In another example, rules for quantizing the CSI difference value may quantize the difference value into one of a plurality of values representing a finer-grained classification of the difference value (e.g., highly accurate, accurate, acceptable, inaccurate, highly inaccurate).

At block 508, the UE reports, to the network entity, the calculated CSI and the quantized CSI difference value.

Figure 6:
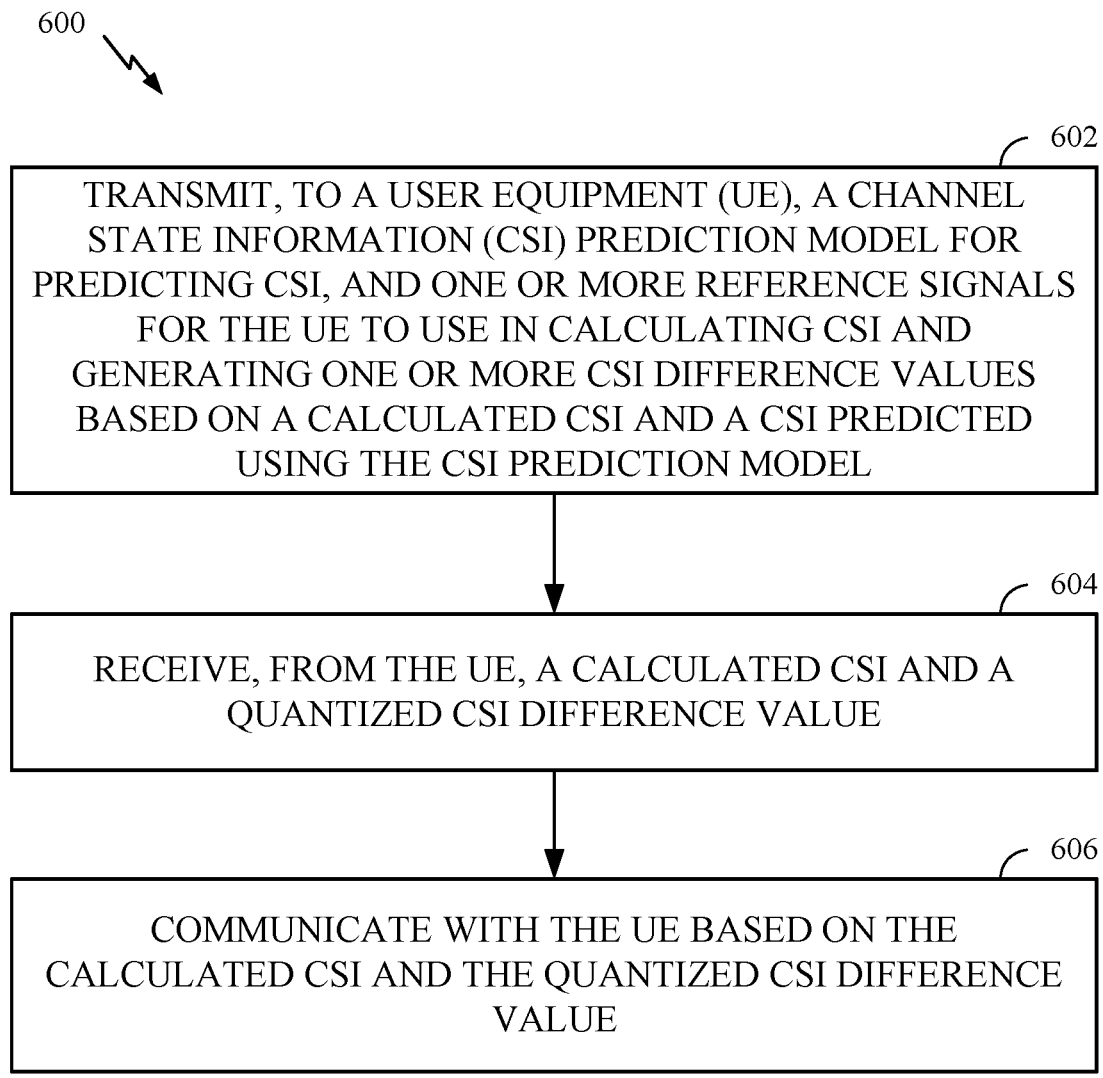
FIG. 6 illustrates example operations for wireless communication by a network entity for configuring a user equipment (UE) to predict channel state information (CSI)

FIG. 6 illustrates example operations 600 for wireless communications by a network entity. Operations 600 may be considered complimentary to operations 500 of FIG. 5 discussed above. For example, operations 600 may be performed by a BS 110a (e.g., a gNB) of FIG. 1 or FIG. 2 to configure a UE to predict CSI and quantize the accuracy of the predicted CSI and use the predicted CSI and quantized accuracy of the predicted CSI to perform transmissions to the UE, in accordance with certain aspects of the present disclosure.

As illustrated, operations 600 begin at block 602, where the network entity transmits, to a user equipment (UE), a channel state information (CSI) prediction model for predicting CSI and one or more reference signals for the UE to use in calculating CSI and generating one or more CSI difference values (e.g., generating one or more CSI difference values based on a calculated CSI and a CSI predicted based on the CSI prediction model). Generally, the network entity can configure the UE to predict CSI and quantize one or more CSI difference values by transmitting, to the UE, a configuration message including the CSI prediction model and a qualifying scheme that the UE can use to quantize the accuracy of the CSI predicted using the CSI prediction model. In some embodiments, when the network entity configures the with the CSI prediction model and the qualifying rules for quantizing the CSI difference value, the network entity may implicitly configure the UE to report the calculated CSI and the quantized CSI difference value. In some embodiments, the UE may explicitly configure the UE to report the calculated CSI and the quantized CSI difference value, for example, based on a qualifying session, as discussed in further detail below.

At block 604, the network entity receives, from the UE, a calculated CSI and a quantized CSI difference value. The quantized CSI difference value may be a quantized value generated based on a CSI difference value which represents a difference between a current CSI measurement and a predicted CSI generated using a previous CSI measurement and a time delay between the previous CSI measurement and the time at which the current CSI measurement is generated. As discussed, the quantized CSI difference value may be a value generated based on the qualifying scheme discussed above with respect to block 602.

At block 606, the network entity communicates with the UE based on the calculated CSI and the quantized CSI difference value. For example, the network entity may adjust a modulation and coding scheme, a rank indicator, or other parameters used to perform transmissions with the UE.

Operations 500 and 600 of FIGS. 5 and 6 may be understood with reference to the call flow diagrams shown in FIGS. 9 and 10. In other words, the UEs and gNBs of FIGS. 9 and 10 may perform operations 500 and 600 of FIGS. 6 and 7.

FIG. 7 illustrates an example timeline of measuring CSI and predicting CSI based on the measured CSI. Timeline 700 illustrates four instances 702a-702d of CSI measurement and prediction Generally, an instance 702 of CSI measurement and prediction may be based on an expected time at which the network entity is to transmit data and a time at which the UE is to measure CSI and generate a CSI feedback report that the network entity can use to identify parameters for transmitting signals to the UE. The instances may represent CSI measurements performed during a training or qualifying process, as discussed in further detail below, or during communications with a network entity.

Given a time t representing a time at which the network entity receives CSI feedback from the UE, a UE may measure CSI and generate and transmit a CSI feedback report to the network entity at time $t-\Delta_1$. Time $t+\Delta_2$ represents a time at which the network entity will perform a transmission to the UE. Because channel conditions (and thus, the measured CSI) may change during the timing gap of $\Delta_1+\Delta_2$ between when the UE reports CSI to the network entity and when the network entity is to perform a transmission to the UE, the UE may predict the CSI at time $t+\Delta_2$ using a prediction model that takes the measured CSI at time $t-\Delta_1$ and the duration of the timing gap $\Delta_1+\Delta_2$ as inputs.

In each instance 702, the UE may measure CSI at time $t+\Delta_2$ and calculate the difference between the measured CSI at time $t+\Delta_2$ and the predicted CSI. The difference between the measured CSI at time $t+\Delta_2$ and the predicted CSI may be quantized according to a qualifying scheme that classifies the difference between the measured CSI at time $t+\Delta_2$ and the predicted CSI into one of a plurality of categories. In some aspects, the quantized difference between the measured CSI at time $t+\Delta_2$ and the predicted CSI may be reported individually for each instance 702 in timeline 700.

In some aspects, the qualifying scheme may specify that a quantized difference value is to be generated based on a moving average over a time window W. For example, as illustrated in FIG. 7, the window W may cover four instances 702 of CSI measurements and predictions. In such a case, the difference between the measured CSI at time $t+\Delta_2$ and the predicted CSI for each instance 702a-d in window W may be averaged, and the averaged difference between the measured CSI at time $t+\Delta_2$ and the predicted CSI may be quantized using the qualifying scheme. By averaging differences between the measured CSI at time $t+\Delta_2$ and the predicted CSI over a moving window W, the UE may account for CSI predictions made by the UE that may not be reported to the network entity (e.g., due to the UE being configured with a low-overhead configuration for CSI feedback, when CSI for a first carrier is based on measurements on a second carrier, etc.).

In some aspects, the qualifying scheme may specify that the quantized difference value is to be generated as the average of the most recent n CSI prediction. In such a case, the number of CSI predictions used to generate the quantized difference value may remain constant, as opposed to the use of a sliding time window W in which an arbitrary number of predictions may be considered.

In some aspects, the qualifying scheme may define the difference between the calculated (or measured) CSI and the predicted CSI as the infinite impulse response (IIR) filtered difference between the calculated CSI and the CSI predicted based on the CSI prediction model. The IIR filtered difference may take previously calculated differences between the measured CSI at time $t+\Delta_2$ and the predicted CSI into account by using these previously calculated differences into an IIR filter.

The quantized CSI difference value may be quantized using a qualification scheme that quantizes the CSI difference value into one of at least two categories. A one-bit indicator for the quantized CSI difference value may represent a coarse classification in which one value indicates that the CSI difference value is less than an a priori defined threshold value (e.g., indicating that the CSI difference value corresponds to an accurate prediction), which may be a network-configured and defined value. The other value for the one-bit indicator may indicate that the CSI difference value exceeds the a priori defined threshold value (e.g., indicating that the CSI difference value corresponds to an inaccurate prediction). Larger numbers of bits for representing the quantized CSI difference value may allow for increased granularity representing the level of accuracy for the CSI difference value. Generally, one or more values of the quantized CSI difference value may correspond to a predicted CSI that is a "qualified" prediction (e.g., a prediction meeting a threshold level of accuracy), and other values of the quantized CSI difference value may correspond to a predicted CSI that is a "non-qualified" prediction (e.g., a prediction that does not meet the threshold level of accuracy).

In some aspects, the UE may be configured to report the predicted CSI based on a gating function. The gating function may, for example, allow for the reporting of the predicted CSI if the predicted CSI corresponds to a qualified prediction. The predicted CSI may not be reported if the predicted CSI corresponds to a non-qualified prediction. In some embodiments, the gating function may indicate that a number of consecutive qualified CSI predictions may need to be made before the UE can report the predicted CSI to the network entity.

If the UE does not report the predicted CSI or reports that a prediction is an unqualified prediction, the network entity may determine that the CSI prediction model did not accurately predict CSI at time $t+\Delta_2$. Thus, the network entity may use other techniques to account for CSI aging. For example, as discussed above the network entity can use an a priori defined backoff scheme to use a different modulation and coding scheme or rank indicator for transmissions to the UE than the modulation and coding scheme or rank indicator associated with the reported CSI measurement.

In some aspects, predicted CSI may be used for early HARQ feedback. In such a case, the qualifying scheme may be defined in terms of a misdetection rate or a false-alarm rate. As discussed above, a misdetection rate may represent a rate at which an erroneous early ACK is transmitted to the network entity for a packet (e.g., an ACK is sent for a packet that is not correctly received, which may cause packet loss due to the early release of resources). A false-alarm rate may represent a rate at which an erroneous early NACK is transmitted to the network entity for a packet (e.g., a NACK is sent for a packet that is correctly received). The qualifying scheme may configure the UE to report predicted CSI if the misdetection rate or the false alarm rate is below a threshold value (e.g., the misdetection rate or the false alarm rate is a qualified rate) and to not report the predicted CSI if the misdetection rate or the false alarm rate is above the threshold value (e.g., the misdetection rate or the false alarm rate is a unqualified rate). The misdetection rate or the false alarm rate may be calculated as a moving average over a time window W, the average misdetection rate or false alarm rate over N predictions, or an IIR filtered value. In some cases, the network entity may configure the UE to report early HARQ feedback when the feedback is qualified with respect to the misdetection rate or with respect to both the misdetection rate and the false alarm rate.

FIG. 8 shows a call flow diagram of messages that may be exchanged between a UE 802 and a gNB 804 (or other network entity) to configure UE 802 to predict CSI based on a CSI prediction model and quantize the accuracy of CSI predictions based on a qualifying scheme.

As illustrated, to configure UE 802 to predict CSI based on a CSI prediction model, gNB 804 transmits CSI prediction model and qualifying scheme 810 to the UE. The CSI prediction model, as discussed, may be a machine learning model configured to execute on the UE and predict CSI at a future point in time given a current CSI measurement and a time delay as input. The qualifying scheme generally identifies qualifying rules for determining whether a predicted CSI is a qualified prediction or an unqualified prediction, as discussed above.

After UE 802 is configured with the CSI prediction model and qualifying scheme 810, UE 802 may be ready to perform CSI measurements and predict CSI based on the measured CSI. To do so, gNB 804 may transmit reference signals 812 to UE 802. As discussed, gNB 804 may configure UE 802 with information about measurement occasions in which reference signals are transmitted to UE 802 and reporting occasions in which CSI feedback reports are to be transmitted to gNB 804. gNB 804 may modify one or more transmission parameters based on the received CSI feedback reports and use these transmission parameters for transmissions to UE 802.

At 814, the UE measures CSI based on the reference signals. The UE also predicts CSI at a future time using the prediction model. As discussed, the prediction model uses the measured CSI and a time gap between the measurement based on reference signals 812 and when another transmission is expected to be received from gNB 804 (e.g., in this example, when gNB 804 transmits reference signals 816 to UE 802).

Subsequently, gNB 804 transmits reference signals 816 to UE 802. At 818, the UE measures CSI based on the reference signals. The UE also calculates a difference between the predicted CSI generated at 814 and the measured CSI generated by measuring reference signals 816 and quantizes the difference based on the qualifying scheme received from gNB 804 in message 810. As discussed, UE 802 may generate the quantized difference value into one of a plurality of values based on rules included in the qualifying scheme for classifying the difference value. Some of the quantized values may correspond to qualified predictions, and other quantized values may correspond to non-qualified predictions.

After calculating the difference between the predicted CSI generated at 814 and the measured CSI generated by measuring reference signals 816 and quantizing the difference, UE 802 generates and transmits a message 820 including the measured CSI and the quantized difference 820. gNB 804 can use the measured CSI and the quantized difference 820 to determine whether the CSI prediction model is accurately generating predictions of channel state information. If the CSI prediction model is accurately generating predictions of channel state information, gNB 804 can subsequently use received CSI measurements from UE 802, predict CSI based on the received measurements and a time delay between measurement and transmission of a signal to UE 802, and adjust transmission parameters (e.g., adjust a modulation and coding scheme, rank indicator, etc.) for the transmission to the UE.

In some aspects, a gNB may arrange a session to qualify CSI predictions for a UE. During the session, the UE may transmit, to the gNB, a series of predicted CSI and measured CSI values (which may be referred to as "prediction and ground-truth pairs"). The gNB may, prior to initiating the session to qualify CSI predictions, may configure the UE with the CSI prediction model, but may not configure the UE with the qualifying scheme. While the session is active, the gNB may qualify the predictions based on the qualifying scheme and may add information about the predicted CSI, the measured CSI, and whether the prediction is a qualified prediction to a training data set for use in retraining and refining the CSI prediction model. After the session is completed, the gNB may configure the UE to report qualified predictions (e.g., by transmitting, to the UE, information identifying the predictions made during the session that were determined to be qualifying predictions).

In some aspects, the series of prediction and ground-truth pairs may be generated using varying parameters. For example, the prediction and ground-truth pairs may be generated using different time delays between measurement at the UE and transmission of a signal from the gNB (e.g., different values of $\Delta_1 + \Delta_2$). In another example, the series of prediction and ground-truth pairs may be based on one or more of early HARQ ACK/NACK statistics, a precoding matrix indicator (PMI), channel quality indicator (CQI), rank indicator (RI), signal-to-noise ratio (SNR), or other measurements or statistics that may provide information about FIG. 9 shows a call flow diagram of messages that may be exchanged between a UE 902 and a gNB 904 (or other network entity) to arrange a session to qualify CSI predictions for a UE, as discussed above.

As illustrated, gNB 904 may transmit CSI prediction model 910 to UE 902. In some aspects, transmitting the CSI prediction model 910 may be accompanied by an explicit indication that gNB 904 is initiating a session to qualify CSI prediction for UE 902. In some aspects, transmitting the CSI prediction model without the qualifying scheme may implicitly indicate that gNB 904 is initiating a session to qualify CSI prediction for US 902.

Subsequently, gNB 904 may transmit reference signals 912 to UE 902. At 914, the UE may measure CSI based on the reference signals 912 and may predict CSI at a future time using the prediction model. As discussed, the prediction model uses the measured CSI and a time gap between the measurement based on reference signals 912 and when another transmission is expected to be received from gNB 904. In some aspects, the time gap may be an assumed amount of time specified by gNB 904 for predicting CSI.

Subsequently, gNB 904 transmits reference signals 916 to UE 902. At 918, the UE measures CSI based on the reference signals. The UE also calculates a difference between the predicted CSI generated at 914 and the measured CSI generated by measuring reference signals 916. UE 902 may then transmit a message 920 including the predicted CSI and measured CSI to gNB 904 for use by the gNB to configure a qualifying scheme for the UE.

Generally, reference signals 912 and 916, and the corresponding operations 914 and 918 at the UE 902 may be repeated until the session for qualifying CSI prediction for UE 902 is completed. After the session is completed, at 922, the gNB determines whether the differences reported by the UE indicate that the respective CSI predictions are qualified or nonqualified predictions. After determining whether the predictions are qualified or nonqualified predictions, gNB 904 can generate the qualifying scheme configuration and transmit the qualified scheme configuration 924 to UE 902 for subsequent use.

FIG. 10 illustrates a communications device 1000 (e.g., a user equipment) that may include various components (e.g., corresponding to means-plus-function components) configured to perform operations for the techniques disclosed herein, such as the operations illustrated in FIG. 5. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 5, or other operations for performing the various techniques discussed herein. In certain aspects, computer-readable medium/memory 1012 stores code 1014 for receiving a channel state information (CSI) prediction model for quantized CSI, code 1016 for calculating CSI based on downlink reference signal measurements, code 1018 for generating a quantized CSI difference value based on a quantization of a difference between the calculated CSI and CSI predicted based on the CSI prediction model, and code 1020 for reporting the calculated CSI and the quantized CSI difference value. In certain aspects, the processor 1004 has circuitry configured to implement the code stored in the computer-readable medium/memory 1012. The processor 1004 includes circuitry 1022 for receiving a channel state information (CSI) prediction model for quantized CSI, circuitry 1024 for calculating CSI based on downlink reference signal measurements, circuitry 1026 for generating a quantized CSI difference value based on a quantization of a difference between the calculated CSI and CSI predicted based on the CSI prediction model, and circuitry 1028 for reporting the calculated CSI and the quantized CSI difference value.

FIG. 11 illustrates a communications device 1100 (e.g., a network entity, such as a gNodeB) that may include various components (e.g., corresponding to means-plus-function components) configured to perform operations for the techniques disclosed herein, such as the operations illustrated in FIG. 6. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 6, or other operations for performing the various techniques discussed herein. In certain aspects, computer-readable medium/memory 1112 stores code 1114 for transmitting a channel state information (CSI) prediction model for predicting CSI and one or more reference signals to a user equipment (UE); code 1116 for receiving a calculated CSI and quantized CSI difference value; and code 1118 for communicating with the UE based on the calculated CSI and the quantized CSI difference value. In certain aspects, the processor 1104 has circuitry configured to implement the code stored in the computer-readable medium/memory 1112. The processor 1104 includes circuitry 1120 for transmitting a channel state information (CSI) prediction model for predicting CSI and one or more reference signals to a user equipment (UE); circuitry 1122 for receiving a calculated CSI and quantized CSI difference value; and circuitry 1124 for communicating with the UE based on the calculated CSI and the quantized CSI difference value.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

The invention claimed is:

1. A method for wireless communications by a user equipment (UE), comprising:
receiving, from a network entity, a channel state information (CSI) prediction model for quantized CSI and a qualifying scheme for classifying a predicted CSI;
calculating CSI based on downlink reference signal measurements;
generating a quantized CSI difference value based on a quantization of a difference between the calculated CSI and the predicted CSI, the predicted CSI based on the CSI prediction model; and
reporting, to the network entity, the calculated CSI and the quantized CSI difference value and an indication of whether the predicted CSI is a qualified or nonqualified prediction based on the qualifying scheme and the difference between the calculated CSI and the predicted CSI.

2. The method of claim 1, wherein a qualified prediction comprises a prediction for which the difference between is less than a threshold amount.

3. The method of claim 1, further comprising: reporting the predicted CSI based on a determination that the predicted CSI is a qualified prediction.

4. The method of claim 1, wherein the predicted CSI is used for early hybrid automatic repeat request (HARQ) feedback.

5. The method of claim 4, wherein the qualifying scheme comprises a determination of a misdetection rate or a false alarm rate.

6. The method of claim 5, wherein a qualified prediction comprises a CSI prediction made when the misdetection rate or the false alarm rate is less than a threshold amount.

7. The method of claim 5, wherein a nonqualified prediction comprises a CSI prediction made when the misdetection rate or the false alarm rate exceeds a threshold amount.

8. The method of claim 1, further comprising:
reporting, to the network entity, the calculated CSI and the predicted CSI; and
receiving, from the network entity, configuration information instructing the UE to report qualified CSI predictions based on the qualifying scheme.

9. The method of claim 8, wherein the calculated CSI and the predicted CSI comprise one or more of early hybrid automatic repeat request (HARQ) acknowledgment (ACK)/negative acknowledgment (NACK) (HARQ-ACK/NACK), precoding matrix indicator (PMI), channel quality indicator (CQI), rank indicator (RI), or signal-to-noise ratio (SNR).

10. The method of claim 1, wherein the quantized CSI difference value comprises one of a plurality of values indicating a size of the difference between the calculated CSI and the predicted CSI.

11. The method of claim 1, wherein the difference between the calculated CSI and the predicted CSI comprises an infinite impulse response (IIR) filtered difference between the calculated CSI and the predicted CSI.

12. A method for wireless communications by a user equipment (UE), comprising:
receiving, from a network entity, a channel state information (CSI) prediction model for quantized CSI;
calculating CSI based on downlink reference signal measurements;
generating a quantized CSI difference value based on a quantization of a difference between the calculated CSI and a predicted CSI, the predicted CSI based on the CSI prediction model, wherein the quantized CSI difference value is based on an average of the difference between the calculated CSI and the predicted CSI over a time window; and
reporting, to the network entity, the calculated CSI and the quantized CSI difference value.

13. A method for wireless communications by a network entity, comprising:
transmitting, to a user equipment (UE), a channel state information (CSI) prediction model for predicting CSI, one or more reference signals for the UE to use in calculating CSI and generating one or more CSI difference values based on a calculated CSI and a predicted CSI, and a qualifying scheme for classifying the predicted CSI based on the CSI prediction model, the predicted CSI based on the CSI prediction model;
receiving, from the UE, a calculated CSI, a quantized CSI difference value, and an indication of whether the predicted CSI is a qualified or nonqualified prediction based on the qualifying scheme and a difference between the calculated CSI and the predicted CSI; and
communicating with the UE based on the calculated CSI and the quantized CSI difference value.

14. The method of claim 13, wherein a qualified prediction comprises a prediction for which the difference is less than a threshold amount.

15. The method of claim 13, further comprising:
receiving the predicted CSI; and
determining that the predicted CSI is a qualified prediction based on receiving the predicted CSI.

16. The method of claim 13, wherein the predicted CSI is used for early hybrid automatic repeat request (HARQ) feedback.

17. The method of claim 16, wherein the qualifying scheme comprises a scheme that classifies predicted CSI based on a misdetection rate or a false alarm rate.

18. The method of claim 17, further comprising: determining that the predicted CSI comprises a CSI prediction made when the misdetection rate or the false alarm rate is less than a threshold amount based on receiving the predicted CSI.

19. The method of claim 13, further comprising:
receiving, from the UE, the calculated CSI and the predicted CSI; and
transmitting, to the UE, configuration information instructing the UE to report qualified CSI predictions based on the qualifying scheme.

20. The method of claim 19, wherein the calculated CSI and the predicted CSI comprise one or more of early hybrid automatic repeat request (HARQ) acknowledgment (ACK)/negative acknowledgment (NACK) (HARQ-ACK/NACK), precoding matrix indicator (PMI), channel quality indicator (CQI), rank indicator (RI), or signal-to-noise ratio (SNR).

21. The method of claim 13, wherein the quantized CSI difference value comprises one of a plurality of values indicating a size of the difference between the calculated CSI and the predicted CSI.

22. The method of claim 13, wherein the difference between the calculated CSI and the predicted CSI comprises an infinite impulse response (IIR) filtered difference between the calculated CSI and the predicted CSI.

23. A method for wireless communications by a network entity, comprising:
- transmitting, to a user equipment (UE), a channel state information (CSI) prediction model for predicting CSI and one or more reference signals for the UE to use in calculating CSI and generating one or more CSI difference values based on a calculated CSI and a predicted CSI, the predicted CSI based on the CSI prediction model;
- receiving, from the UE, a calculated CSI and a quantized CSI difference value, wherein the quantized CSI difference value comprises an average of the difference between the calculated CSI and the predicted CSI over a time window; and
- communicating with the UE based on the calculated CSI and the quantized CSI difference value.

24. An apparatus for wireless communications by a user equipment (UE), comprising:
- a processor configured to:
  - receive, from a network entity, a channel state information (CSI) prediction model for quantized CSI and a qualifying scheme for classifying a predicted CSI,
  - calculate CSI based on downlink reference signal measurements,
  - generate a quantized CSI difference value based on a quantization of a difference between the calculated CSI and the predicted CSI, the predicted CSI based on the CSI prediction model, and
  - report, to the network entity, the calculated CSI and the quantized CSI difference value and an indication of whether the predicted CSI is a qualified or nonqualified prediction based on the qualifying scheme and the difference between the calculated CSI and the predicted CSI; and
- a memory.

25. An apparatus for wireless communications by a network entity, comprising:
- a processor configured to:
  - transmit, to a user equipment (UE), a channel state information (CSI) prediction model for predicting CSI, one or more reference signals for the UE to use in calculating CSI and generating one or more CSI difference values based on a calculated CSI and a predicted CSI, and a qualifying scheme for classifying the predicted CSI based on the CSI prediction model, the predicted CSI based on the CSI prediction model,
  - receive, from the UE, a calculated CSI a quantized CSI difference value, and an indication of whether the predicted CSI is a qualified or nonqualified prediction based on the qualifying scheme and a difference between the calculated CSI and the predicted CSI, and
  - communicate with the UE based on the calculated CSI and the quantized CSI difference value; and
- a memory.

26. An apparatus for wireless communications by a user equipment, comprising:
- a processor configured to:
  - receive, from a network entity, a channel state information (CSI) prediction model for quantized CSI,
  - calculate CSI based on downlink reference signal measurements,
  - generating a quantized CSI difference value based on a quantization of a difference between the calculated CSI and a predicted CSI, the predicted CSI based on the CSI prediction model, wherein the quantized CSI difference value is based on an average of the difference between the calculated CSI and the predicted CSI over a time window, and
  - reporting, to the network entity, the calculated CSI and the quantized CSI difference value; and
- a memory.

27. An apparatus for wireless communications by a network entity, comprising:
- a processor configured to:
  - transmit, to a user equipment (UE), a channel state information (CSI) prediction model for predicting CSI and one or more reference signals for the UE to use in calculating CSI and generating one or more CSI difference values based on a calculated CSI and a predicted CSI, the predicted CSI based on the CSI prediction model,
  - receive, from the UE, a calculated CSI and a quantized CSI difference value, wherein the quantized CSI difference value comprises an average of the difference between the calculated CSI and the predicted CSI over a time window, and
  - communicate with the UE based on the calculated CSI and the quantized CSI difference value; and
- a memory.

* * * * *